United States Patent
Pineau et al.

(10) Patent No.: US 12,492,013 B2
(45) Date of Patent: Dec. 9, 2025

(54) METHOD FOR EVALUATING THE RELATIVE STATE OF AN AIRCRAFT ENGINE

(71) Applicant: SAFRAN, Paris (FR)

(72) Inventors: Edouard Guy Henri Marie Pineau, Moissy Cramayel (FR); Sébastien Philippe Razakarivony, Moissy Cramayel (FR); Thomas Pierre Louis Bonald, Voisins le Bretonneux (FR)

(73) Assignee: SAFRAN, Paris (FR)

( * ) Notice: Subject to any disclaimer, the term of this patent is extended or adjusted under 35 U.S.C. 154(b) by 452 days.

(21) Appl. No.: 18/004,258

(22) PCT Filed: Jun. 21, 2021

(86) PCT No.: PCT/FR2021/051119
§ 371 (c)(1),
(2) Date: Jan. 4, 2023

(87) PCT Pub. No.: WO2022/008814
PCT Pub. Date: Jan. 13, 2022

(65) Prior Publication Data
US 2023/0264835 A1    Aug. 24, 2023

(30) Foreign Application Priority Data
Jul. 6, 2020  (FR) ........................... 2007139

(51) Int. Cl.
*B64F 5/60*    (2017.01)
*G06N 20/00*    (2019.01)

(52) U.S. Cl.
CPC ............... *B64F 5/60* (2017.01); *G06N 20/00* (2019.01)

(58) Field of Classification Search
CPC .. G08G 5/21; G08G 5/54; G08G 5/34; G08G 5/00; G08G 5/53; G08G 5/55; G08G 5/76;
(Continued)

(56) References Cited

U.S. PATENT DOCUMENTS

| | | | |
|---|---|---|---|
| 9,273,969 B2 * | 3/2016 | Parthasarathy | G01C 21/20 |
| 9,442,490 B2 * | 9/2016 | Mn | G05D 1/0676 |

(Continued)

FOREIGN PATENT DOCUMENTS

| | | | |
|---|---|---|---|
| FR | 2 939 170 A1 | 6/2010 | |
| FR | 3 006 785 A1 | 12/2014 | |

(Continued)

OTHER PUBLICATIONS

International Search Report as issued in International Patent Application No. PCT/FR2021/051119, dated Sep. 13, 2021.

(Continued)

*Primary Examiner* — Mohammad K Islam
(74) *Attorney, Agent, or Firm* — Pillsbury Winthrop Shaw Pittman LLP

(57) ABSTRACT

A method for evaluating the state of an aircraft engine for a given flight, each flight of the aircraft being associated with one time-domain series, includes, each time maintenance of the aircraft is performed, creating a dataset including the (Continued)

time-domain series associated with each flight carried out between the maintenance and the preceding maintenance; creating a set of datasets including each created dataset and dividing it into a training set and a validating set; conjointly training an embedding function and a classifier, selecting a reference time-domain series from a time-domain series of the validating set; and computing a distance between the embedment associated with the time-domain series of the given flight and the embedment of the reference time-domain series, with a view to computing an indicator of engine state.

11 Claims, 4 Drawing Sheets

(58) Field of Classification Search
CPC ...... G01C 23/00; G01C 23/005; G01C 21/20; G01C 340/945; G01C 244/183; G01C 701/14; G01C 701/16; G01C 701/15; G01C 701/03; B64F 5/60; G06N 20/00; G06N 5/01; G06N 7/01; G06N 20/10; G06N 3/08; G07C 5/006; G07C 5/0808; G05B 23/0283; G05B 23/024
See application file for complete search history.

(56) References Cited

U.S. PATENT DOCUMENTS

| | | | | |
|---|---|---|---|---|
| 9,625,261 | B2* | 4/2017 | Polansky | G08G 5/21 |
| 9,815,571 | B1* | 11/2017 | Ogden | G01C 23/00 |
| 10,654,589 | B2* | 5/2020 | De Villele | B64C 9/32 |
| 11,435,580 | B1* | 9/2022 | Sneitzer | B64D 43/00 |
| 2013/0060466 | A1* | 3/2013 | Gurusamy | G01C 23/005 |
| | | | | 701/465 |
| 2018/0029703 | A1* | 2/2018 | Simon | B64U 30/24 |
| 2018/0114452 | A1* | 4/2018 | Dacre-Wright | G05D 1/0005 |
| 2018/0370645 | A1* | 12/2018 | Durand | B64D 31/04 |
| 2021/0107640 | A1* | 4/2021 | Baity | B64U 50/13 |

FOREIGN PATENT DOCUMENTS

| | | |
|---|---|---|
| FR | 3 035 232 A1 | 10/2016 |
| WO | WO 2020/115440 A1 | 6/2020 |

OTHER PUBLICATIONS

Taheri, E., et al., "Survey of prognostics methods for condition-based maintenance in engineering systems," arxiv.org, Cornell University Library, Dec. 2019, XP081546035, 74 pages.

* cited by examiner

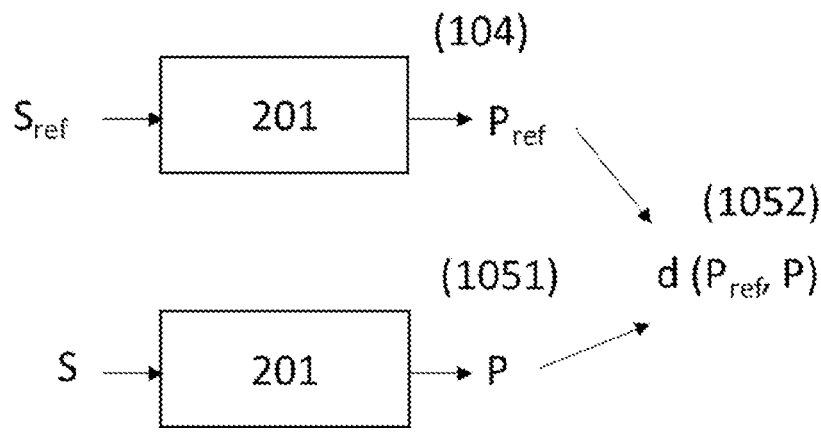
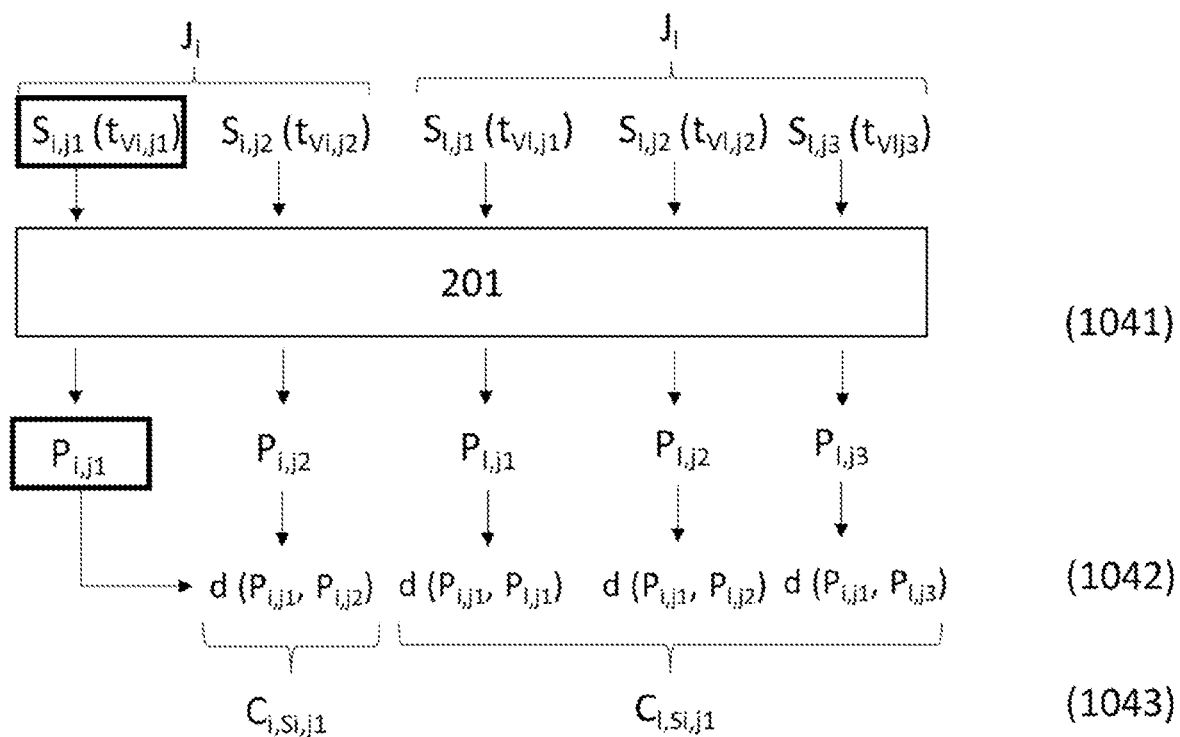
Fig. 6

METHOD FOR EVALUATING THE RELATIVE STATE OF AN AIRCRAFT ENGINE

CROSS-REFERENCE TO RELATED APPLICATIONS

This application is the U.S. National Stage of PCT/FR2021/051119, filed Jun. 21, 2021, which in turn claims priority to French patent application number 2007139, filed Jul. 6, 2020. The content of these applications are incorporated herein by reference in their entireties.

TECHNICAL FIELD OF THE INVENTION

The technical field of the invention is that of monitoring the state of aircraft engines.

The present invention relates to a method for evaluating the state of an aircraft engine, and more particularly a method for evaluating the relative state of an aircraft engine. The present invention also relates to a method for tracking the relative state of an aircraft engine.

TECHNOLOGICAL BACKGROUND OF THE INVENTION

In order to anticipate failures of an aircraft engine, it is known to monitor the state of the engine from data recorded during successive flights of the aircraft, changing over time. For this, several families of methods are conventionally used.

A first family of methods consists in choosing from the data a collection of physical and/or mechanical indicators representative of the engine efficiency and tracking the value of these indicators over time. However, the choice of the collection of indicators is based on the skill in the art, especially on the knowledge of the data and their values in different flight contexts. In addition, the collection of indicators often includes a large amount of data that may not be available for all flights.

A second family of methods consists in using a physical or statistical model, fitting it to the data and then tracking indicators, for example model parameters or residuals. However, such methods require an a priori knowledge of the physical model of the engine or the construction of a replacement statistical model explaining data dynamics.

A third family of methods consists in performing tracking of hidden variables extracted from data by decomposition into explanatory factors.

Whatever the family of methods used, the values of the indicators or variables tracked are obtained for each flight and then a trend is extracted from the time change of the values over all the flights. Thus, these methods do not explicitly use time-related information, for example the fact that the aircraft ages over time, and there is no force to monotonicity in the calculated indicators or variables over time, which may predict an improvement in the state of the engine over some periods of time, when no maintenance operation has been performed.

There is therefore a need to evaluate the state of an aircraft engine by detecting an ageing signal in data recorded during successive flights of the aircraft available for all flights and changing over time, without using a priori knowledge.

SUMMARY OF THE INVENTION

The invention offers a solution to the problems previously discussed, by making it possible to evaluate the state of an aircraft engine by taking ageing of the engine over time into account, from data conventionally recorded during successive flights of the aircraft, without requiring any skill in the art.

A first aspect of the invention relates to a method for evaluating the relative state of an aircraft engine for a given flight of the aircraft, the aircraft having performed a plurality of maintenance operations earlier than the given flight and a plurality of flights between two successive maintenance operations, each maintenance operation being associated with a maintenance time instant, a plurality of collections of variables being recorded during each flight in a recording order, each flight being associated with a time-domain series corresponding to a flight time instant and including the plurality of collections of variables recorded during the flight ordered according to the recording order, the method including the following steps of:

For each maintenance operation, creating a dataset including the time-domain series associated with each flight that has taken place between the maintenance time instant associated with the maintenance operation and the maintenance time instant associated with the previous maintenance operation;

Creating a collection of datasets comprising each dataset created and separating the collection of datasets into a training collection and a validation collection;

Jointly training of an embedding function and a classifier by minimising a cost function, including the following sub-steps of:

For each dataset of the training collection:
Randomly drawing a pair of time-domain series including a first time-domain series and a second time-domain series;
Applying the embedding function to the pair of time-domain series to obtain a pair of embedments;
Using the classifier on the pair of embedments to obtain a probability that the first time-domain series corresponds to a flight time prior to the flight time corresponding to the second time-domain series;
Calculating the cost function from the probability obtained, the flight time corresponding to the first time-domain series and the flight time corresponding to the second time-domain series;
Optimising the embedding function and the classifier by minimising the cost function calculated;

Selecting a reference time-domain series from the time-domain series included in the validation collection, including a sub-step of applying the trained embedding function to the reference time-domain series to obtain a reference embedment;

Calculating an indicator of engine state for the given flight, including the following sub-steps of:
Applying the trained embedding function to the time-domain series associated with the flight, to obtain an embedment;
Calculating a distance between the embedment and the reference embedment, the distance calculated corresponding to the indicator of engine state.

By virtue of the invention, a time-domain series including data successively recorded during the flight, ordered as a function of time is constructed for each flight. The time-domain series corresponding to flights that took place between the same two maintenance operations are gathered within a dataset.

The invention is based on the assumption that information about engine ageing is contained in the data and that ageing is a monotonic process with respect to time.

To extract a monotonic signal reflecting ageing, an embedding function is trained on each dataset of a collection of training datasets using a classifier that forces the embedding function to learn to place, from their time-domain series, each flight corresponding to the same dataset in time order in an embedding space.

Once trained, the embedding function is able to provide a representation of the different time-domain series recorded over the life of the aircraft ordered in time in the embedding space. Calculating a distance in the embedding space between the flight considered and a flight previously made by the aircraft chosen as a reference flight makes it possible to obtain an indicator of engine state taking ageing into account.

As the embedding function has been trained per dataset, the indicator is monotonic between two engine maintenance operations, which prevents the engine state evaluated from improving without performing a maintenance operation.

The invention therefore allows the engine state to be evaluated by explicitly taking ageing into account and without the need for engine modelling or time-domain series unlike prior art.

Further to the characteristics just discussed in the preceding paragraph, the evaluation method according to the first aspect of the invention may have one or more additional characteristics among the following, considered individually or according to all technically possible combinations.

According to one embodiment, the step of selecting the reference time-domain series includes the following sub-steps of:
Applying the trained embedding function to each time-domain series of the validation collection, to obtain an embedment for each time-domain series of the validation collection;
For each time-domain series of the validation collection:
Calculating the distance between the embedment of the time-domain series and the embedment of every other time-domain series in the validation collection;
For each dataset of the validation collection, creating an ageing curve associating, with each flight time instant associated with a time-domain series of the validation collection included in the dataset, the corresponding distance calculated;
For each ageing curve, calculating a monotonicity indicator;
Calculating an ageing indicator from the monotonicity indicators calculated;
the reference time-domain series being the time-domain series for which the ageing indicator calculated meets an ageing condition.

According to one alternative embodiment of the preceding embodiment, the monotonicity indicator calculation sub-step includes the following sub-steps of:
Initialising the monotonicity indicator to zero;
For each time interval between two successive instants of flight, calculating the first-order time derivative of the ageing curve:
If the derivative is positive, incrementing the monotonicity indicator by 1.

According to a sub-alternative embodiment of the preceding alternative embodiment, the ageing indicator is the sum of the monotonicity indicators calculated.

According to one alternative embodiment of the preceding sub-alternative embodiment, the ageing condition is verified for the maximum ageing indicator calculated.

Thus, the reference flight selected is the flight associated with a time-domain series of the validation collection corresponding to the healthiest possible state of the engine, that is the flight allowing to have the most monotonic ageing curves possible.

According to one alternative embodiment compatible with the preceding embodiment, the evaluation method according to the first aspect of the invention further includes a step of triggering an alarm if the indicator of engine state is greater than an alarm threshold.

According to a sub-alternative embodiment of the preceding alternative embodiment, the alarm threshold is equal to the maximum ageing indicator preceding a maintenance operation by a predefined time margin.

Thus, an alarm is triggered when the state of the engine evaluated has reached a level of ageing at which a maintenance operation should be performed to anticipate engine failure. The higher the time margin, the lower the risk that an engine failure will occur before the next maintenance operation.

A second aspect of the invention relates to a method for tracking the relative state of an aircraft engine over a plurality of flights including the steps of the evaluation method according to any of the preceding claims for one flight of the plurality of flights, and the evaluation step for every other flight of the plurality of flights.

A third aspect of the invention relates to a computer program product comprising instructions which, when the program is executed on a computer, cause the same to implement the steps of the evaluation method according to the first aspect of the invention or the steps of the tracking method according to the second aspect of the invention.

The invention and its different applications will be better understood upon reading the following description and upon examining the accompanying figures.

BRIEF DESCRIPTION OF THE FIGURES

The figures are set forth by way of indicating and in no way limiting purposes for the invention.

FIG. 5 shows a schematic representation of the fourth and fifth steps of the method according to the first aspect of the invention.

FIG. 6 shows a schematic representation of first, second and third sub-steps of the first embodiment of the fourth step of the method according to the first aspect of the invention.

DETAILED DESCRIPTION

Unless otherwise specified, a same element appearing in different FIGS. has a unique reference.

A first aspect of the invention relates to a method for evaluating the state of an aircraft engine.

The aircraft is for example an aeroplane, a helicopter or a drone.

The state of the engine is evaluated for a given flight of the aircraft, that is it is assumed that the state of the aircraft engine does not vary during a flight.

In order to implement the method according to the first aspect of the invention, the aircraft should have performed a plurality of maintenance operations and a plurality of flights between two successive maintenance operations, prior to the flight for which the engine state is evaluated.

Figure 3:
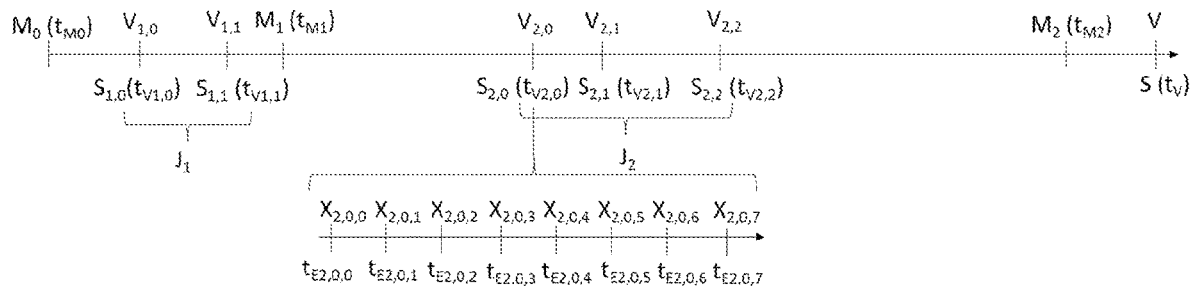
FIG. 3 illustrates an example of the flights and maintenance operations performed over time by the aircraft.

FIG. 3 illustrates an example of the previous maintenance operations $M_i$ and flights $V_{i,j}$ of the aircraft for which the engine state is evaluated for a given flight V.

An i-th maintenance operation $M_i$ is associated with a collection of flights $V_{i,j}$, the notation flight $V_{i,j}$ corresponds to the j-th flight that took place between maintenance operation $M_{i-1}$ and maintenance operation $M_i$.

Each maintenance operation $M_i$ is associated with a maintenance time instant $t_{Mi}$, corresponding for example to the beginning or the end of the time interval necessary to perform the maintenance operation $M_i$.

In FIG. 3, the aircraft has performed three maintenance operations $M_0$, $M_1$, $M_2$ associated respectively with the maintenance time instants $t_{M0}$, $t_{M1}$, $t_{M2}$.

The first maintenance operation $M_0$ of the aircraft is considered to be carried out before it is put into service, that is before its first flight $V_{1,0}$.

During each flight $V_{i,j}$, V, data are periodically recorded. More particularly, collections $X_{i,j,k}$ of variables each associated with a recording time instant $t_{Ei,j,k}$ are recorded. The collections $X_{i,j,k}$ of variables may be recorded at a fixed time interval, that is the time interval between the recording time instants $t_{Ei,j,k}$, $t_{Ei,j,k+1}$ of two collections of variables $X_{i,j,k}$ and $X_{i,j,k+1}$ successively recorded is fixed, or at a variable time interval.

The collections $X_{i,j,k}$ of variables recorded for the same flight $V_{i,j}$, V or for different flights $V_{i,j}$, V all include the same variables.

Each collection of variables includes, for example, at least one variable related to the engine, such as torque, temperature or pressure. One or more environmental variables, for example outside temperature, atmospheric pressure, flight conditions, and/or one or more flight parameters, for example flight controls or load, may be added.

Each flight $V_{i,j}$, V is associated with a time-domain series $S_{i,j}$, S including the collections $X_{i,j,k}$ of variables successively recorded during the flight considered. The collections $X_{i,j,k}$ of variables are ordered in the recording order, that is a first collection $X_{i,j,k}$ of variables recorded at a first recording time instant $t_{Ei,j,k}$ earlier than a second recording time instant $t_{Ei,j,k+1}$ of a second collection $X_{i,j,k+1}$ of variables is located before this second collection $X_{i,j,k+1}$ of variables in the time-domain series $S_{i,j}$, S.

Each time-domain series $S_{i,j}$, S is associated with a flight time instant $t_{Vi,j}$, $t_V$ corresponding to, for example, the beginning or end of the flight $V_{i,j}$, V corresponding to the time-domain series $S_{i,j}$, S.

In FIG. 3, the aircraft has made five flights $V_{1,0}$, $V_{1,1}$, $V_{2,0}$, $V_{2,1}$, $V_{2,2}$ associated respectively with the time-domain series $S_{1,0}$, $S_{1,1}$, $S_{2,0}$, $S_{2,1}$, $S_{2,2}$, prior to the flight V considered, two flights $V_{1,0}$, $V_{1,1}$ between the first maintenance operation $M_0$ and the second maintenance operation $M_1$ and three flights $V_{2,0}$, $V_{2,1}$, $V_{2,2}$ between the second maintenance operation $M_1$ and the third maintenance operation $M_2$. The time-domain series $S_{1,0}$, $S_{1,1}$, $S_{2,0}$, $S_{2,1}$, $S_{2,2}$ are respectively associated with the flight times $t_{V1,0}$, $t_{V2,0}$, $t_{V2,1}$, $t_{V2,2}$.

In FIG. 3, the collections of variables $X_{2,0,0}$, $X_{2,0,1}$, $X_{2,0,2}$, $X_{2,0,3}$, $X_{2,0,4}$, $X_{2,0,5}$, $X_{2,0,6}$, $X_{2,0,7}$ respectively recorded at the recording times $t_{E2,0,0}$, $t_{E2,0,1}$, $t_{E2,0,2}$, $t_{E2,0,3}$, $t_{E2,0,4}$, $t_{E2,0,5}$, $t_{E2,0,6}$, $t_{E2,0,7}$ are represented for flight $V_{2,0}$, $X_{2,0,7}$. The time-domain series $S_{2,0}$ thus includes the collections of variables $X_{2,0,0}$, $X_{2,0,1}$, $X_{2,0,2}$, $X_{2,0,3}$, $X_{2,0,4}$, $X_{2,0,5}$, $X_{2,0,6}$, $X_{2,0,7}$ ordered according to the order of the recording time instants $t_{E2,0,0}$, $t_{E2,0,1}$, $t_{E2,0,2}$, $t_{E2,0,3}$, $t_{E2,0,4}$, $t_{E2,0,5}$, $t_{E2,0,6}$, $t_{E2,0,7}$.

The state evaluated by the method according to the first aspect of the invention for the flight V considered is relative because it is obtained by comparison with a reference flight selected from the flights Vid previously performed by the aircraft. The time-domain series Sid associated with the reference flight is called the reference time-domain series.

Figures 1, 2:
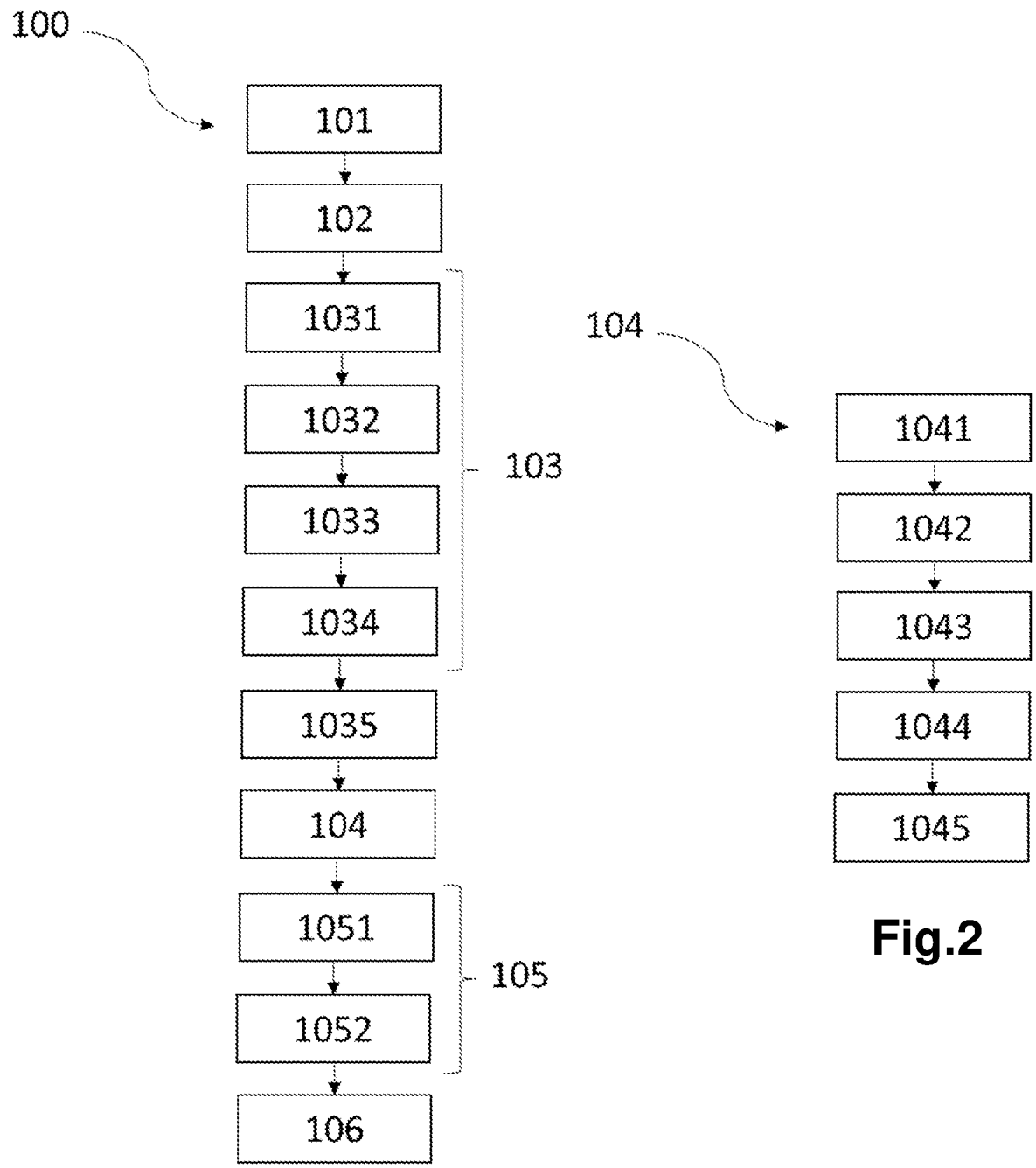
FIG. 1 is a block diagram illustrating the sequence of steps of a method for evaluating the state of an aircraft engine according to the first aspect of the invention.
FIG. 2 is a block diagram illustrating the sequence of sub-steps for a first embodiment of the fourth step of the method according to the first aspect of the invention.

FIG. 1 is a block diagram illustrating the sequence of steps of the method 100 according to the first aspect of the invention.

A first step 101 of the method 100 consists in creating a dataset Ji for each maintenance operation Mi performed by the aircraft before the flight V considered.

The dataset Ji includes the time-domain series $S_{i,j}$ associated with each flight $V_{i,j}$ that has been performed between the maintenance time instant $t_{Mi}$ associated with the maintenance operation $M_i$ and the maintenance time instant $t_{Mi-1}$ associated with the maintenance operation $M_{i-1}$ immediately preceding the maintenance operation $M_i$.

As no flight has been performed before the first maintenance operation $M_0$, no dataset $J_0$ is created for the first maintenance operation $M_0$.

In FIG. 3, a dataset $J_1$ is created for maintenance operation $M_1$ including the time-domain series $S_{1,0}$ and $S_{1,1}$ respectively associated with the flights $V_{1,0}$ and $V_{1,1}$ that occurred between the first maintenance operation $M_0$ and maintenance operation $M_1$. A dataset $J_2$ is created for the maintenance operation $M_2$ including the time-domain series $S_{2,0}$, $S_{2,1}$, $S_{2,2}$ respectively associated with the flights $V_{2,0}$, $V_{2,1}$, $V_{2,2}$ that took place between the maintenance operation $M_1$ and the maintenance operation $M_2$.

A second step 102 of the method 100 consists in creating a collection of datasets comprising each dataset Ji created in the first step 101.

The collection of datasets comprises at least one dataset $J_i$.

Taking the example of FIG. 3, the collection of datasets comprises two datasets $J_1$ and $J_2$.

The second step 102 of the method 100 then consists in separating the collection of datasets into a training collection and a validation collection. For example, if the collection of datasets includes N datasets, the training collection includes n datasets from the N datasets in the collection of datasets, with n strictly less than N, and the validation collection includes N-n datasets. In general, and depending on the number of datasets available, n is chosen so that the training collection includes more datasets than the validation collection.

If the collection of datasets includes a single dataset, the training collection and the validation collection each include, for example, a dataset comprising part of the single dataset of the collection of datasets.

A third step 103 of the method 100 consists in jointly training an embedding function and a classifier.

Figure 4:
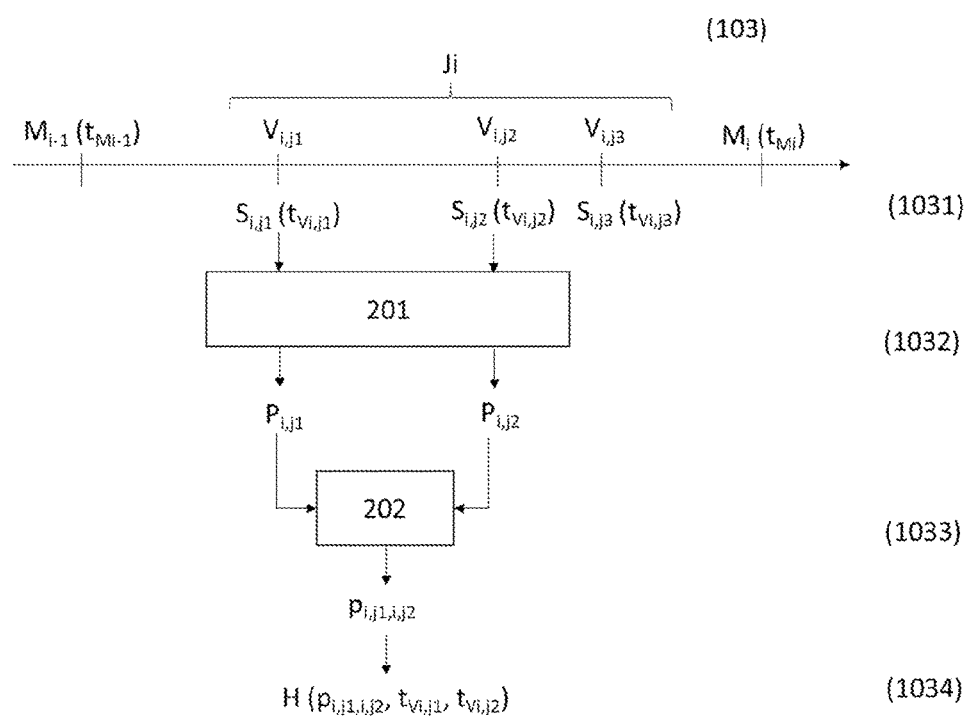
FIG. 4 shows a schematic representation of the third step of the method according to the first aspect of the invention.

FIG. 4 shows a schematic representation of the third step 103 of the method 100.

The embedding function 201 is a parametric function configured to associate a point, called an embedment $P_{i,j}$, in an embedding space, with a time-domain series $S_{i,j}$. The embedding function 201 is chosen as a function of the space of the time-domain series $S_{i,j}$, S.

The embedding function 201 is, for example, a neural network, a distribution density, a parametric analytic function or a representation function defining a Hilbert reproducing kernel.

The classifier 202 is configured to associate a scalar between 0 and 1 corresponding to a probability $p_{i,j1,i,j2}$ to a pair of points in the embedding space, that is to a pair of embeddings $P_{i,j}$ comprising a first embedding $P_{i,j1}$ and a second embedding $P_{i,j2}$. The classifier 202 is chosen according to the embedding space.

The classifier 202 is for example a linear classifier, such as a perceptron, a support vector machine or Bayesian classifier, a quadratic classifier, a neural network or a decision tree.

Training is performed by minimising a cost function H depending on the probability $p_{i,j1,i,j2}$ allowing on the one hand to update parameters of the classifier 202 so that the probability $p_{i,j1,i,j2}$ calculated by the classifier 202 corresponds to the probability that a first time-domain series $Si,j1$ corresponding to the first embedding $P_{i,j1}$ is associated with a flight time instant $t_{Vi,j1}$ earlier than the flight time instant $t_{Vi,j2}$ associated with a second time-domain series $S_{i,j2}$ corresponding to the second embedding $P_{i,j2}$, and on the other hand to update parameters of the embedding function 201 so that it is able to order the embeddings $P_{i,j}$ corresponding to the time-domain series $S_{i,j}$ according to the time order in the embedding space.

The third step 103 comprises several sub-steps performed for each dataset $J_i$ of the training collection.

A first sub-step 1031 of the third step 103 consists in randomly drawing from the dataset $J_i$ of the training collection, a pair of time-domain series including a first time-domain series $S_{i,j1}$ and a second time-domain series $S_{i,j2}$.

In FIG. 4, the first sub-step 1031 is performed for a dataset $J_i$ including three flights $V_{i,j1}$, $V_{i,j2}$, $V_{i,j3}$ respectively associated with the time-domain series $S_{i,j1}$, $S_{i,j2}$, $S_{i,j3}$, and the time-domain series $S_{i,j1}$ and $S_{i,j2}$ are randomly drawn.

A second sub-step 1032 of the third step 103 consists in using the embedding function 201 to associate the pair of time-domain series drawn in the first sub-step 1031 with a pair of embeddings $P_{i,j1}$, $P_{i,j2}$.

In FIG. 4, an embedding $P_{i,j1}$ is obtained for the time-domain series $S_{i,j1}$ and an embedding $P_{i,j2}$ is obtained for the time-domain series $S_{i,j2}$ using the embedding function 201.

A third sub-step 1033 of the third step 103 consists in using the classifier 202 to obtain the probability $p_{i,j1,i,j2}$ for the pair of embeddings $P_{i,j1}$, $P_{i,j2}$ obtained in the second sub-step 1032.

In FIG. 4, a probability $p_{i,j1,i,j2}$ is obtained for a pair of embeddings including the embedding $P_{i,j1}$ and the embedding $P_{i,j2}$ using the classifier 202.

A fourth sub-step 1034 of the third step 103 consists in calculating the cost function H from the probability $p_{i,j1,i,j2}$ obtained in the third sub-step 1033, the flight time instant $t_{Vi,j1}$ corresponding to the first time-domain series $S_{i,j1}$ and the flight time instant $t_{Vi,j2}$ corresponding to the second time-domain series $S_{i,j2}$.

The cost function H is for example a binary entropy function, expressed as:

$$H(p_{i,j1,i,j2})=c(t_{Vi,j1},t_{Vi,j2})\log(p_{i,j1,i,j2})+(1-c(t_{Vi,j1},t_{Vi,j2}))\log(1-p_{i,j1,i,j2})$$

With c being 0 if the flight time instant $t_{Vi,j1}$ corresponding to the first time-domain series is later than the flight time instant $t_{Vi,j2}$ corresponding to the second time-domain series $S_{i,j2}$ and being 1 if the flight time instant $t_{Vi,j1}$ corresponding to the first time-domain series $S_{i,j1}$ is earlier than the flight time instant $t_{Vi,j2}$ corresponding to the second time-domain series $S_{i,j2}$.

In the case of FIG. 4, c is 1 since the first time-domain series $S_{i,j1}$ is associated with a flight time instant $t_{Vi,j1}$ earlier than the flight time instant $t_{Vi,j2}$ corresponding to the second time-domain series $S_{i,j2}$.

The cost function H is in another example a regularised binary entropy function, expressed as:

$$H(p_{i,j1,i,j2})=c(t_{Vi,j1},t_{Vi,j2})\log(p_{i,j1,i,j2})+(1-c(t_{Vi,j1},t_{Vi,j2}))\log(1-p_{i,j1,i,j2})+\|P_{i,j1}\|+\|P_{i,j2}\|$$

With $\|.\|$ corresponding to the regularisation term by for example L1 norm $\|.\|_1$ to obtain a sparse embedment or L2 norm $\|.\|_2$ to obtain a spherical embedment centred in 0.

The cost function H is in another example the following function:

$$H(p_{i,j1,i,j2})=\|c(t_{Vi,j1},t_{Vi,j2})-p_{i,j1,i,j2}\|$$

A fifth sub-step 1035 of the third step 103 consists in optimising the embedding function 201 and the classifier 202 by minimising the cost function H calculated in the fourth sub-step 1034.

FIG. 5 shows a schematic representation of a fourth and a fifth step 105 of the method 100.

The fourth step 104 of the method 100 consists in selecting the reference time-domain series $S_{ref}$ from the time-domain series $S_{i,j}$ included in the validation collection.

FIG. 2 is a block diagram illustrating the sequence of sub-steps for a first embodiment of the fourth step 104 of the method 100.

FIG. 6 shows a schematic representation of a first sub-step 1041, a second sub-step 1042 and a third sub-step 1043 of the first embodiment of the fourth step 104 of the method 100.

The first sub-step 1041 of the fourth step 104 according to the first embodiment consists in applying the trained embedding function 201 to each time-domain series $S_{i,j}$ of the validation collection, to obtain an embedment $P_{i,j}$ for each time-domain series $S_{i,j}$ of the validation collection.

In FIG. 6, the validation collection includes a first dataset Ji comprising two time-domain series $S_{i,j1}$, $S_{i,j2}$ and a second dataset Ji comprising three time-domain series $S_{I,j1}$, $S_{I,j2}$, $S_{I,j3}$. In the first sub-step 1041 of the fourth step 104 according to the first embodiment, an embedment $P_{i,j1}$ is obtained for the time-domain series $S_{i,j1}$, an embedment $P_{i,j2}$ is obtained for the time-domain series $S_{i,j2}$, an embedment $P_{I,j1}$ is obtained for the time-domain series $S_{I,j1}$, an embedment $P_{I,j2}$ is obtained for the time-domain series $S_{I,j2}$ and an embedment $P_{I,j3}$ is obtained for the time-domain series $S_{I,j3}$.

The second sub-step 1042, the third sub-step 1043, the fourth sub-step 1044 and the fifth sub-step 1045 are performed for each time-domain series $S_{i,j}$ in the validation collection.

The second sub-step 1042 of the fourth step 104 according to the first embodiment consists in using the embedment $P_{i,j}$ calculated in the first sub-step 1041 for each time-domain series $S_{i,j}$ of the validation collection, to calculate a distance d between the embedment $P_{i,j}$ of a time-domain series $Si,j$ considered and the embedding of each of the other time-domain series of the validation collection.

For example, in FIG. 6, the time-domain series considered is the time-domain series $S_{i,j1}$ which is shown as a box. During the second sub-step 1042 of the fourth step 104 according to the first embodiment, a distance d $(P_{i,j1}, P_{i,j2})$ is calculated between the time-domain series $S_{i,j1}$ considered and the time-domain series $S_{i,j2}$, a distance d $(P_{i,j1}, P_{I,j2})$ is calculated between the time-domain series $S_{i,j1}$ considered and the time-domain series $S_{I,j1}$, a distance d ($P_{i,j1}$, $P_{I,j2}$) is calculated between the time-domain series $S_{i,j1}$ and the time-domain series $S_{I,j2}$ and a distance d ($P_{I,j1}$, $P_{I,j3}$) is calculated between the time-domain series $S_{i,j1}$ considered and the time-domain series $S_{I,j3}$.

The distance d is a distance on the embedding space. For example, if the embedding space is a space of distributions, the distance d can be any distance defined on the space of distributions. If the embedding space is a vector space, the distance d can be any distance defined on a vector space. A distance d ($P_{i,j1}$, $P_{I,j2}$) calculated between the vector embedment $P_{i,j1}$ of the time-domain series Si,j1 and the vector embedment $P_{I,j2}$ of the time-domain series $S_{I,j2}$ is for example the distance $L_2$ between vectors $P_{i,j1}$ and $P_{I,j2}$ which is expressed as follows:

$$\|P_{i,j1} - P_{i,j2}\|$$

The third sub-step 1043 of the fourth step 104 according to the first embodiment consists in creating an ageing curve $C_{i,Si,j}$ for each dataset Ji of the validation collection and each time-domain series $S_{i,j}$ of the validation collection considered.

Figure 7:
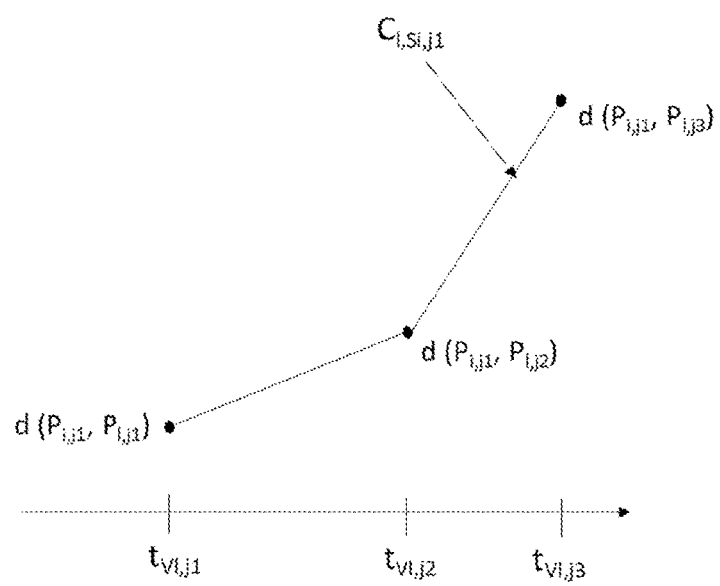
FIG. 7 represents an example of an ageing curve.

FIG. 7 represents an example of an ageing curve of a dataset.

For a dataset $J_I$ considered, the ageing curve $C_{I,Si,j}$ associates, with each flight time instant $t_{VI,j}$ associated with a time-domain series $S_{I,j}$ of the validation collection included in the dataset JI, the distance d calculated in the second sub-step 1042 of the fourth step 104 according to the first embodiment, between the time-domain series $S_{i,j}$ considered and the time-domain series $S_{I,j}$ of the validation collection included in the dataset $J_I$.

In FIG. 6, the validation collection includes only two datasets Ji and JI. In the third sub-step 1043 of the fourth step 104 according to the first embodiment, an ageing curve $C_{i,Si,j1}$ is created for the dataset Ji and an ageing curve $C_{I,Si,j1}$ is created for the dataset $J_I$. Since the time-domain series considered is the time-domain series $S_{i,j1}$, the ageing curve $C_{i,Si,j1}$ includes the distance d ($P_{i,j1}$, $P_{i,j2}$) between the time-domain series $S_{i,j1}$ considered and the time-domain series $S_{i,j2}$, and the ageing curve $C_{I,Si,j1}$ includes the distance d ($P_{i,j1}$, $P_{I,j1}$) between the time-domain series $S_{i,j1}$ considered and the time-domain series $S_{I,j1}$, the distance d ($P_{i,j1}$, $P_{I,j2}$) between the time-domain series $S_{i,j1}$ considered and the time-domain series $S_{I,j2}$ and the distance d ($P_{i,j1}$, $P_{I,j3}$) between the time-domain series $S_{i,j1}$ considered and the time-domain series $S_{I,j3}$.

In FIG. 7, the ageing curve $C_{I,Si,j1}$ calculated for the dataset $J_I$ with respect to the time-domain series Si,j considered is represented as a function of time. The ageing curve $C_{I,Si,j1}$ is for example a continuous function with respect to time constructed by linear interpolation.

The fourth sub-step 1044 of the fourth step 104 according to the first embodiment consists in calculating a monotonicity indicator for each ageing curve $C_{i,Si,j}$ created in the third sub-step 1043 of the fourth step 104 according to the first embodiment.

The fourth sub-step 1044 of the fourth step 104 according to the first embodiment includes, for example, a first sub-step of initialising the monotonicity indicator to zero, and then a second sub-step of calculating the first-order time derivative of the ageing curve $C_{i,Si,j}$ for each time interval between two successive flight time instants $t_{Vi,j}$ and incrementing the monotonicity indicator by 1 when the derivative calculated is positive.

The monotonicity indicator of an ageing curve then corresponds to the number of time intervals between two successive flight time instants $t_{Vi,j}$ for which the first-order time derivative of the ageing curve $C_{i,Si,j}$ is positive.

The fifth sub-step 1045 of the fourth step 104 according to the first embodiment consists in calculating an ageing indicator from each monotonicity indicator calculated in the fourth sub-step 1044 of the fourth step 104 according to the first embodiment.

The ageing indicator is, for example, the sum of the monotonicity indicators calculated in the fourth sub-step 1044 of the fourth step 104 according to the first embodiment.

At the end of the fifth sub-step 1045 of the fourth step 104 according to the first embodiment, an ageing indicator is calculated for each time-domain series $S_{i,j}$ of the validation collection.

The reference time-domain series $S_{ref}$ is then the time-domain series $S_{i,j}$ for which the ageing indicator calculated in the fifth sub-step 1045 of the fourth step 104 according to the first embodiment meets an ageing condition.

The ageing condition is for example verified for the maximum ageing indicator.

The embedment $P_{i,j}$ calculated in the first sub-step 1041 of the fourth step 104 according to the first embodiment for the reference time-domain series $S_{ref}$ is called the reference embedment Pref.

According to the second embodiment, the reference time-domain series $S_{ref}$ is the time-domain series S1,0 associated with the first flight V1,0 of the aircraft.

The fourth step 104 according to the second embodiment includes a sub-step of using the embedding function 201 trained on the reference series $S_{ref}$ to obtain a reference embedment Pref.

The fifth step 105 of the method 100 consists in calculating an indicator of engine state for the flight V considered.

A first sub-step 1051 of the fifth step 105 consists in applying the trained embedding function 201 to the time-domain series S associated with the flight V to obtain an embedment P, as illustrated in FIG. 5.

A second sub-step 1052 of the fifth step 105 consists in calculating the distance d between the embedment P calculated in the first sub-step 1051 of the fifth step 105 and the reference embedment Pref, as illustrated in FIG. 5.

The indicator of engine state is then equal to the distance d calculated in the second sub-step 1052 of the fifth step 105.

Figure 8:
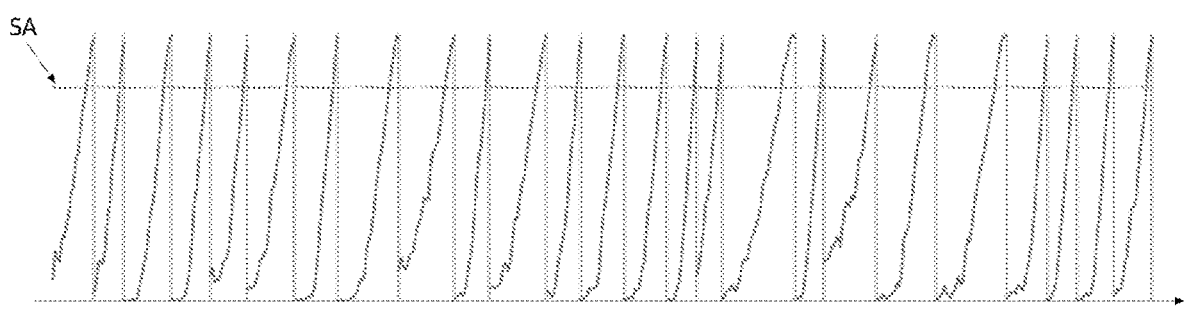
FIG. 8 represents the relative state of the aircraft engine over time.

FIG. 8 represents the relative state of the aircraft engine over time, as a curve representing the indicator of engine state as a function of time. Vertical lines represent time instants of the maintenance operations performed. This curve thus presents a discontinuity at each maintenance operation $M_i$; it is approximately monotonic between two maintenance operations Mi, corresponding to the ageing curve of a dataset calculated between these two maintenance operations.

The method 100 may further include a sixth step 106 consisting in triggering an alarm if the indicator of engine state is greater than an alarm threshold AT.

The alarm threshold AT is, for example, equal to the maximum ageing indicator preceding a maintenance operation Mi by a predefined time margin, that is to the ageing indicator having the largest value among a collection of ageing indicators including each ageing indicator calculated at a time instant preceding a maintenance operation $M_i$ by the time margin.

A second aspect of the invention relates to a method for tracking the relative state of the aircraft engine over a collection of flights V.

The tracking method according to the second aspect of the invention includes, for example, the steps of the evaluation method 100 according to the first aspect of the invention for a first flight V of the collection of flights, and then the sixth step 106 of the evaluation method 100 according to the first aspect of the invention for the other flights V of the collection of flights.

A third aspect of the invention relates to a computer program product comprising instructions which, when the program is executed on a computer, cause the same to implement the steps of the evaluation method according to the first aspect of the invention or the steps of the tracking method according to the second aspect of the invention.

The computer program product according to the invention is a surveillance or monitoring tool, preferably implemented on the ground.

The invention claimed is:

1. A method for evaluating a relative state of an aircraft engine for a given flight of an aircraft, the aircraft having performed a plurality of maintenance operations prior to the given flight and a plurality of flights between two successive maintenance operations, each maintenance operation being associated with a maintenance time instant, a plurality of collections of variables being recorded during each flight in a recording order, each flight being associated with a time-domain series corresponding to a flight time instant and including the plurality of collections of variables recorded during the flight ordered according to the recording order, the method comprising:
    for each maintenance operation, creating a dataset including the time-domain series associated with each flight that has been carried out between the maintenance time instant associated with the maintenance operation and the maintenance time instant associated with the previous maintenance operation;
    creating a collection of datasets comprising each dataset created and separating the collection of datasets into a training collection and a validation collection;
    jointly training an embedding function and a classifier by minimising a cost function, including the following sub-steps of:
        for each dataset of the training collection:
            randomly drawing a pair of time-domain series including a first time-domain series and a second time-domain series;
            applying the embedding function to the pair of time-domain series to obtain a pair of embedments;
            using the classifier on the pair of embedments to obtain a probability that the first time-domain series corresponds to a flight time instant earlier than the flight time instant corresponding to the second time-domain series;
            calculating the cost function from the probability obtained, the flight time instant corresponding to the first time-domain series and the flight time instant corresponding to the second time-domain series;
        optimizing the embedding function and the classifier by minimising the cost function calculated;
    selecting a reference time-domain series from the time-domain series included in the validation collection, including a sub-step of applying the trained embedding function to the reference time-domain series to obtain a reference embedment;
    calculating an indicator of engine state for the given flight, including the following sub-steps of:
        applying the trained embedding function to the time-domain series associated with the flight, to obtain an embedment;
        calculating a distance between the embedment and the reference embedment, the distance calculated corresponding to the indicator of engine state,
    comparing the indicator of engine state to a predetermined maintenance threshold, and
    when the indicator of engine state exceeds the predetermined maintenance threshold, performing a maintenance operation on the aircraft engine.

2. The evaluation method according to claim 1, wherein selecting the reference time-domain series includes the following sub-steps of:
    applying the trained embedding function to each time-domain series of the validation collection, to obtain an embedment for each time-domain series of the validation collection;
    for each time-domain series of the validation collection:
        calculating the distance between the embedment of the time-domain series and the embedment of each other time-domain series of the validation collection;
        for each dataset of the validation collection, creating an ageing curve associating with each flight time instant associated with a time-domain series of the validation collection included in the dataset, the corresponding distance calculated;
        for each ageing curve, calculating a monotonicity indicator;
        calculating an ageing indicator from the monotonicity indicators calculated;
    the reference time-domain series being the time-domain series for which the ageing indicator calculated meets an ageing condition.

3. The evaluation method according to claim 2, wherein calculating the monotonicity indicator includes the following sub-steps of:
    initializing the monotonicity indicator to zero;
    for each time interval between two successive flight time instants, calculating the first-order time derivative of the ageing curve:
        when the derivative is positive, incrementing the monotonicity indicator by 1.

4. The evaluation method according to claim 3, wherein the ageing indicator is the sum of the monotonicity indicators calculated.

5. The evaluation method according to claim 4, wherein the ageing condition is verified for a maximum ageing indicator calculated.

6. The evaluation method according to claim 1, wherein the cost function is a binary entropy function.

7. The evaluation method according to claim 1, further comprising triggering an alarm when the indicator of engine state is greater than an alarm threshold.

8. The evaluation method according to claim 2, further comprising triggering an alarm when the indicator of engine state is greater than an alarm threshold, and wherein the alarm threshold is equal to a maximum ageing indicator preceding a maintenance operation by a predefined time margin.

9. A method for tracking a relative state of an aircraft engine over a plurality of flights including steps of the evaluation method according to claim 6 for one flight of the plurality of flights, and the triggering step for every other flight of the plurality of flights.

10. A non-transitory computer readable medium comprising instructions which, when the instructions are executed on a computer, cause the computer to implement the steps of the evaluation method according to claim 1.

11. A non-transitory computer readable medium comprising instructions which, when the instructions are executed on a computer, cause the computer to implement the steps of the tracking method according to claim 9.

* * * * *